US011897654B2

(12) United States Patent
Schalk

(10) Patent No.: US 11,897,654 B2
(45) Date of Patent: Feb. 13, 2024

(54) APPARATUS FOR THE MANUAL OR MACHINE PRODUCTION OF A TUBE-LIKE PACKAGING MATERIAL AND PACKING STATION

(71) Applicant: Sprick GmbH Bielefelder Papier-und Wellpappenwerke & Co., Bielefeld (DE)

(72) Inventor: Bastian Schalk, Detmold (DE)

(73) Assignee: Sprick GmbH Bielefelder Papier-Und Wellpappenwerke & Co., Bielefeld (DE)

( * ) Notice: Subject to any disclaimer, the term of this patent is extended or adjusted under 35 U.S.C. 154(b) by 256 days.

(21) Appl. No.: 16/985,976

(22) Filed: Aug. 5, 2020

(65) Prior Publication Data

US 2021/0016906 A1 Jan. 21, 2021

Related U.S. Application Data

(63) Continuation of application No. PCT/EP2019/052590, filed on Feb. 4, 2019.

(30) Foreign Application Priority Data

Feb. 6, 2018 (DE) ......................... 102018102621.8

(51) Int. Cl.
*B31D 5/00* (2017.01)
*B65B 9/06* (2012.01)
(Continued)

(52) U.S. Cl.
CPC .............. *B65B 9/06* (2013.01); *B31D 5/0039* (2013.01); *B65B 41/12* (2013.01); *B65B 67/04* (2013.01);
(Continued)

(58) Field of Classification Search
CPC .......... B31D 5/0039; B31D 2205/0023; B31D 2205/0035; B31D 2205/0047
See application file for complete search history.

(56) References Cited

U.S. PATENT DOCUMENTS 5,647,720 A * 7/1997 Golicz .................... B62B 1/002 414/788.9
6,095,454 A * 8/2000 Simmons, Jr. ....... B31D 5/0047 414/745.9
(Continued)

FOREIGN PATENT DOCUMENTS

CA 2 511 312 A1 7/2004
DE 195 20 907 A1 1/1996
(Continued)

OTHER PUBLICATIONS

International Search Report and Written Opinion of the International Search Authority dated Jun. 24, 2019 in International Application No. PCT/EP2019/052590 (English and German languages) (17 pp.).

(Continued)

*Primary Examiner* — Chelsea E Stinson
(74) *Attorney, Agent, or Firm* — Banner & Witcoff Ltd.

(57) ABSTRACT

An apparatus for the manual or machine production of a tube-like packaging material from a paper supply unit, such as a paper strip wound up to a roll, includes a roll longitudinal axis and forming an inner hollow space, or a paper strip folded to a Leporello stack defining an upper side, from which the paper strip is drawable for forming the packaging material. A guiding chute has an opening for ejecting the packaging material from a paper supply unit arranged in an ejection position. The guiding chute has an inner contour narrowing in an ejection direction towards an opening. A receiving arrangement, such as a tube magazine, encompasses at least one paper supply unit at least partly circum-
(Continued)

ferentially with paper supply units arranged sequentially behind each other, wherein the apparatus having a movable transport, such as a slide, for displacing at least the at least one paper supply unit in the ejection direction.

19 Claims, 3 Drawing Sheets

(51) Int. Cl.
*B65B 41/12* (2006.01)
*B65B 67/04* (2006.01)

(52) U.S. Cl.
CPC ................ *B31D 2205/0023* (2013.01); *B31D 2205/0035* (2013.01); *B31D 2205/0047* (2013.01)

(56) References Cited

U.S. PATENT DOCUMENTS

| | | | | |
|---|---|---|---|---|
| 6,422,503 | B1 * | 7/2002 | Hoo Kong | A47K 10/38 242/559.4 |
| 8,568,128 | B2 * | 10/2013 | Sprick-Schutte | B31D 5/0047 493/464 |
| 8,696,345 | B2 * | 4/2014 | Sprick-Schutte | B31D 5/0047 493/464 |
| 10,661,523 | B2 * | 5/2020 | Wetsch | B26D 5/20 |
| 11,225,043 | B2 * | 1/2022 | Schalk | B31B 50/38 |
| 2012/0093956 | A1 * | 4/2012 | Sprick-Schutte | B31D 5/0047 425/162 |
| 2012/0165172 | A1 | 6/2012 | Wetsch et al. | |
| 2014/0274647 | A1 * | 9/2014 | Wetsch | B31D 5/0043 493/464 |
| 2015/0119224 | A1 | 4/2015 | Orsini et al. | |
| 2015/0360434 | A1 | 12/2015 | Van der Kaap | |
| 2016/0151991 | A1 * | 6/2016 | Wetsch | B26F 3/02 493/352 |

FOREIGN PATENT DOCUMENTS

| | | | |
|---|---|---|---|
| DE | 10 2008 039 618 | A1 | 3/2010 |
| DE | 20 2012 009 025 | U1 | 2/2013 |
| WO | WO 01/96097 | A2 | 12/2001 |
| WO | WO 02/34506 | A2 | 5/2002 |
| WO | WO 2019/012053 | A1 | 1/2019 |

OTHER PUBLICATIONS

Office Action dated Aug. 23, 2018 for German Patent Application No. 10 2018 102 621.8 (German language only) (10 pp.).

* cited by examiner

APPARATUS FOR THE MANUAL OR MACHINE PRODUCTION OF A TUBE-LIKE PACKAGING MATERIAL AND PACKING STATION

PRIORITY

This application is a continuation application of International PCT Patent Application No. PCT/EP2019/052590 filed on Feb. 4, 2019, entitled "DEVICE FOR PRODUCING A TUBULAR PACKAGING MATERIAL MANUALLY OR BY MACHINE, AND PACKING STATION," which claims priority to German Patent Application No. 10 2018 102 621.8 filed on Feb. 6, 2018, the entire contents of each of which are herein incorporated by reference.

TECHNICAL FIELD

The invention refers to an apparatus for the manual or machine production of a tube-like packaging material from a paper supply unit, such as a paper strip wound up to a roll, the paper strip forming an inner hollow space, or a paper strip folded to a Leporello stack, the paper strip defining an upper side, from which the paper strip is drawable for forming a packaging material. The invention also refers to a packing station with an apparatus for the manual or machine production of a tube-like packaging material from a paper supply unit.

BACKGROUND

A packaging material dispenser and a packing station with a such is known from DE 20 2012 009 025 U1. The packaging material dispenser comprises a receiving unit with an axial fixture mounted on the same, in which the paper supply unit in the shape of a paper strip roll can be introduced. The axial fixture is realized as a cone-shaped ejection chute. The receiving unit is formed by a half shell. The rotation symmetric ejection chute with cone-shaped inner and outer contour is arranged at the front-sided end of the half shell. The source material for the tube-like packaging material of the packaging material dispenser is a paper strip wound up to a roll, which is introduced in the receiving unit and encompasses the roll. The roll has an inner hollow space, from which the paper strip is drawable for forming a spiral or tube-shaped packaging material. The packaging material roll, the half shell, the cone section-shaped ejection chute and its ejection opening are all arranged coaxially to each other.

The packaging material dispenser known from DE 20 2012 009 025 U1 enjoys great popularity, since it can be operated maintenance free, it is easy to control and is suited very well particularly for small mail-order businesses to produce packing material for filling hollow spaces in shipping cases cost-efficiently and unsophisticatedly as well as space-savingly and environmentally friendly. The packaging material dispenser can be mounted on a table, in order to form a packing station. The packaging material dispenser can for example be mounted via a mounting plate on the tabletop or via a tilting apparatus to a table leg. When so many packages have been filled with a manual packaging material production apparatus that the paper strip roll is empty, the packaging staff can simply introduce a new roll. In particular, mail-order businesses with large throughput volume demand for a possibly nonstop filling of shipment cases with packaging material. In particular, filling breaks for reloading are undesired.

SUMMARY

It is therefore an objective of the invention to overcome the disadvantages of prior art, particularly to provide an apparatus for the manual or machine production of a tube-like packaging material from a paper supply unit and a packing station with such an apparatus, at which a pausing of the filling of shipment cases with packaging material for the purpose of reloading the packaging material production apparatus with a new paper supply unit is reduced or even avoided.

This objective is solved by the subject matter of the independent claims 1 and 9.

According to the invention, an apparatus for the manual or machine production of a tube-like packaging material from a paper supply unit, such as a paper strip wound-up to a roll, is provided, the paper strip forming an inner hollow space, or a paper strip folded to a Leporello stack, the paper strip defining an upper and a bottom side, from which the paper strip is drawable for forming the packaging material. A tube-like packaging material can also be denoted as three-dimensional packaging material. A three-dimensional packaging material can be brought into a three-dimensional structure having at least one frontal hollow space, in order to provide a dampening or cushioning function from a two-dimensional, flat, strip-shaped source material in the shape of a paper supply unit, such as a Leporello stack or a paper strip roll. Such a frontal hollow space can extend in the longitudinal direction of the packaging material. In so far, it can be denoted as a tube-like packaging material. The packaging material tube can be stabilized, for example embossed, or be ripped off without stabilization.

The paper supply unit can for example be provided as a roll, whose axial length is half the size of its outer diameter and/or its axial length is at the most two times greater than its outer diameter. The ratio of its axial length to the outer diameter of the roll is greater than 0.75, particularly greater than 1, and/or smaller than 1.75, particularly 1.5. For example, the ratio of axial length to the outer diameter of the roll can amount for about 1.25. The inner diameter of the roll in as new condition of the roll is larger than 1 cm, larger than 5 cm, particularly larger than 10 cm, and/or smaller than 25 cm, smaller than 20 cm, particularly smaller than 17.5 cm. An inner diameter of a new roll can for example amount for 16 cm.

Alternatively, a paper supply unit can be provided by a essentially cuboid Leporello stack. A particularly cuboid Leporello stack defines an upper side and a bottom side, between which a stack height (vertical) is extending. A single Leporello stack can have a stack height of 50 mm to 60 mm, such as 100 mm to 300 mm, or 150 mm. A particularly cuboid Leporello stacks defines a length (in ejection direction) from a front-sided front side to a rear-sided rear side of the stack. A single Leporello stack can have a length of 100 mm to 400 mm, particularly 250 mm to 350 mm, such as 280 mm. A cuboid Leporello stack can provide a stack width (transverse to longitudinal and ejection direction, respectively, and transverse to height and vertical direction, respectively), extending between two opposing side faces of the Leporello stack. A single Leporello stack can have a stack width of 200 mm to 500 mm, particularly 300 mm to 400 mm, such as 350 mm. The Leporello stack comprises layers stacked on top of each other in the vertical direction, wherein particularly one stack layer can correspond to one sheet of paper of the paper strip. The front faces of the Leporello stack can be formed by folding edges of adjacent layers of the paper strip. The side faces can be formed by lateral marginal edges of the paper strip extending longitudinally to the paper strip.

The apparatus comprises a guiding chute with an opening for ejecting the packaging material from a paper supply unit, that means for example a Leporello stack or a roll, which is arranged in an ejection position. In the ejection position, the paper supply unit, particularly the front side of the roll or the Leporello stack, can be present in a, for example flat and/or circumferentiating, touching contact with the inner side of the guiding chute. The guiding chute provides an opening narrowing towards the inner contour in the ejection direction. The opening can for example be circular-shaped. The cross-sectional width of the opening is smaller than transverse dimension of the paper supply unit, for example the outer diameter of the roll or the width of the Leporello stack. The width of the opening can for example be smaller than ⅔, smaller than half or smaller than ⅓ of the transverse dimension of the paper supply unit in the ejection position. A center line of the walls of the guiding chute and its narrowing inner contour, respectively, can define the chute axis. The chute axis can run according to the ejection axial direction. The ejection opening can be coaxial to the ejection chute. The inner contour of the guiding chute can define a chute axis, wherein between the chute axis and the inner contour, a chute opening angle of at least 15° and/or at the most 75° is spanned. The chute opening angle spans at least 30° and/or at the most 60°. Particularly preferred, a chute opening angle can be in the range between 40° and 50°, such as 45°. The chute axis runs centeredly, with regard to the inner contour as rotation symmetry axis, through the inner contour narrowing chute-like. According to an optional embodiment, the chute axis is angled relatively to the roll axis and the Leporello stack bottom side, respectively. The narrowing inner contour of the guiding chute can have different shapes. For example, the inner contour can be cone-shaped, cone section-shaped, pyramid-shaped, elliptical, arched convexly or concavely, etc. The chute-like narrowing inner contour can be formed rotation symmetrically and or mirror symmetrically in order to facilitate the production order assembly.

The apparatus comprises a receiving arrangement for encompassing at least one paper supply unit at least partly circumferentiatingly. The receiving arrangement can be formed particularly for circumferentiatingly encompassing at least two and/or at the most five, such as three paper supply units arranged sequentially behind each other. The several paper supply units, which are to be received by the receiving arrangement, can be of the same kind, particularly dimensioned equally and/or be of the same material. The receiving arrangement can have a constant, particularly cylinder half shell-shaped, cross-section in the progression along the roll axis. A cylinder half shell-shaped receiving arrangement has an inner diameter, which essentially (+0 . . . 10%) corresponds to the outer diameter of the inserted rolls. Particularly, the receiving arrangement can have a constant wall diameter in the axial progression, for example along the roll axis. The receiving arrangement is formed free of a resistance in the axial direction and in the ejection direction, respectively, particularly free of an axial motion limitation in addition to the guiding chute. According to an embodiment, the receiving arrangement comprises exactly one first paper supply unit, such as a roll or a Leporello stack. Alternatively, or additionally, the receiving arrangement can have a shell body, which is particularly essentially formed half cylindrically and/or defines a receiving longitudinal axis, which is arranged correspondingly, particularly flushing, to the ejection direction and/or corresponding, to the longitudinal extension direction of the paper supply unit, particularly flushing, to the roll axis of the roll or parallel, plane parallel, to the bottom side of the Leporello stack. The receiving arrangement can have a shell body for example made of plastics, particularly with a wall thickness of less than 5 mm. The shell body of the receiving arrangement is dimensioned with an inner diameter, which is at least as great as the thickness of a Leporello stack or the outer diameter of a roll, which is provided for the loading of the apparatus. The inner diameter of the receiving arrangement measures at least 20 cm, particularly less than 25 cm, particularly less than 30 cm. It may be that the inner diameter of the receiving arrangement is smaller than 100 cm, particularly smaller than 50 cm. A shell body can also have a different shape than a half cylindric shape, for example a V-shaped cross-section or a polygonal cross-section. A respective ratio relative to the receiving unit transverse width can then serve instead of the above-described ratios relative to the receiving unit diameter. Alternatively, the receiving arrangement can be formed by at least two struts extending in the direction of the ejection direction, on which the paper supply units, such as rolls or Leporello stacks, can lie. A receiving arrangement can comprise several struts extending longitudinally in the ejection direction and/or transversely to the ejection direction in order to encompass a packaging material strip roll circumferentially at least partly. In so far, a receiving longitudinal axis can also be defined by a receiving arrangement formed by tracks or struts.

The arrangement has a movable transport means, such as a slide or such, for displacing the at least one paper supply unit, particularly of the several paper supply units, in the ejection direction. The transport means can be provided for transporting at least one paper supply unit into the receiving arrangement. The transport means can bring at least one paper supply unit into the ejection position, from which the paper strip can be drawn from the paper supply unit, particularly the inner hollow space of the roll or the upper side of the Leporello stack, for forming of packaging material.

According to one embodimentone embodiment of the apparatus for the manual or machine production of a tube-like packaging material, the transport means is movable in such a way that the receiving arrangement is movable between an engagement position displaced backwards against the ejection direction and an ejection position being positioned upstream in an ejection direction. The transport means can be movable translatorically relatively to the receiving arrangement. Particularly, the transport means can be movable entirely translatorically. According to one embodimentone embodiment of the apparatus for the production of its tube-like packaging material, the transport means is movable in such a way that the at least one paper supply unit is displaceable from the engagement position being displaced backwards against the ejection direction into the ejection position being positioned upstream in the ejection direction by the transport means. Particularly, the transport means can be movable in such a way that the transport means is movable forwards and backwards between the engagement position displaced backwards and the ejection direction positioned upstream in the ejection direction particularly translatorically. For example, the receiving arrangement for receiving several paper supply units can be formed in such a way that initially a first paper supply unit is arranged in the ejection position, from which the paper strip can be ejected through the guiding chute and its opening. A second paper supply unit, as well as, if appropriate, further paper supply units, are for this purpose positioned in the receiving arrangement behind the first paper supply unit, that means further away from the guiding chute and its opening. After the dispensing of the first paper supply unit, the packing staff can activate the transport means in order to move the second paper supply unit to the front into the ejection position. The transport means can detect the second paper supply unit in a position displaced backwards, which can be denoted as engagement position, in order to bring the second paper supply unit into the ejection position positioned upstream. If applicable, further available paper supply units can also be moved forward by the activation of the transport means to a position behind the previous second paper supply unit being then present in the ejection position.

According to one embodimentone embodiment of the apparatus for the production of a tube-like packaging material according to the invention, the transport means comprises an activation device. The activation device can be a manual activation device, such as a lever and/or a handle, for the manual activation of the transport means. The activation device can be accessible at the front side and/or at the rear side of the apparatus for the user, such as packing staff or reloading staff. The activation device can convert the force exerted manually into a transport force for moving the at least one paper supply unit from an engagement position into the ejection position positioned upstream. The activation device can be a motorized activation device such as an electronic button with an electromotor for motorized activation of the transport means. The activation device can be formed motorized and, in reaction for example to a manual activation or a sensor status, use a force generated by a motor for the movement of a transport means and subsequently for the movement of at least one paper supply unit.

According to an embodiment of the apparatus for the production of a tube-like packaging material, which can be realized alternatively or additionally to the one previously described, the transport means can comprise a translatorically movable linear conveyor means such as push and/or pull rod, a gear rack, a conveyor belt, a conveyor chain or such, and/or the transport means can be positioned at least partly in a guide adjacent to the receiving arrangement. Particularly, the transport means can be positioned in a guide directly adjacent to the receiving arrangement. For example, a translatorically movable transport means realized as push and/or pull rod can be positioned in a pull rod or a different translatorically movable linear conveyor means adjacent to the receiving arrangement.

According to one embodiment of the apparatus for the production of a tube-like packaging material, which is combinable with the previous, the transport means comprises at least one carrier, such as a wedge, for holding the radial outer circumferential face and/or axial rear-side face of at least one paper supply unit to be conveyed. An axial rear-side face of a paper supply unit to be conveyed can denote the axial front face of the paper supply unit to be conveyed, which points in the direction averted by the guiding chute and its opening, respectively, and opposite to the ejection direction, respectively. For example, at least one common carrier can be provided for several paper supply units to be conveyed. Alternatively, each of one supply unit individual carrier can be provided. It is thinkable that a corresponding number of each of one carrier corresponding to one paper supply unit can be provided in a receiving arrangement for receiving a predefined number of paper supply units.

According to a further development of the invention, the carrier is movable between an active position and a passive position. The carrier can serve in the active position for the movement of at least one paper supply unit to be conveyed in the ejection direction and/or for a carrier engagement regarding the at least one paper supply unit to be conveyed, wherein the carrier for holding the paper supply unit engages in the receiving arrangement in transverse direction, particularly in radial direction regarding the roll axis. In a passive position for moving the transport means against the ejection direction and/or without carrier effect regarding the at least one paper supply unit, the at least one carrier can be arranged in the passive position such as entirely outside the receiving arrangement, for example inside the transport means or inside the guide. If several carriers are provided, it can be that all carriers are movable between an active position for moving the at least one paper supply unit to be conveyed in the ejection direction and a passive position for moving the transport means against the ejection direction and without carrier effect regarding the at least one paper supply unit, such as movable independently from each other.

According to a further development of the apparatus, which is combinable with the previous ones, the carrier can be pre-tensed in the direction of the active position, particularly by means of a spring and/or be formed as body being arrowed and/or narrowing against the ejection direction, such as a wedge or such. The shape of the carrier can be formed in such a way that depending on the motion direction of the transport means, the carrier is moving automatically into the active position or passive position when impinging on the at least one paper supply unit, wherein particularly the shape of the carrier is formed in such a way that the at least one roll is carried along during the motion of the transport means from the engagement position to the ejection position in the ejection direction and/or that a carrier unfolds no carrier effect during a motion of the transport means against the ejection direction, for example slides along beneath the at least one paper supply unit.

According to a further development of the apparatus for the production of a tube-like packaging material, the carrier can be tiltable between the active position and the passive position around a tilting axis being stationary relatively to the transport means. During that, the carrier can be folded in, particularly in the passive position. The carrier can be folded in the transport means in the passive position through the transport means or next to the transport means. The carrier can be folded inside, through or next to a conveyor means of the transport means, such as a pull rod, a gear rack, a conveyor belt, a conveyor chain or such.

According to one embodiment of the apparatus, the inner contour of the guiding chute runs, starting at a front-ended side of the guiding chute in the ejection axial direction to the receiving arrangement, directly following up to the receiving unit, continuously in the ejection axial direction. The continuous progression of the inner contour in the ejection axial direction is particularly step-, kink- and/or edge-free. In particular, the inner contour can run in the ejection axial direction in sections straight and/or in sections with a curvature. The curvature extending in the axial direction has a curvature radius, which amounts at least 1 cm, such as less than 2 cm, particularly less than 5 cm or at least 10 cm. For a smaller curvature radius, particularly below 0.5 cm, a continuous progression cannot be assumed. Sections being straight in the axial ejection direction and being bent in the axial ejection direction merge into each other continuously, particularly step-, kink- and/or edge free. For a transition between a bent and a straight section, the orientation of the straight section corresponds to a tangent at the end of the curved section. It is also thinkable that a curved section merges with a first curvature radius in the ejection axial direction continuously into a curved section with a second, different, curvature radius. For example, the curvature radius in the first curved section can be greater than in the second curved section. The transition region between two curved sections has a curvature transition adapting continuously from the one to the other curvature radius.

The ejection axial direction can be orientated relatively to the longitudinal extension direction of the paper supply unit, for example regarding the roll axis or regarding the Leporello stack bottom-side face, angularly. In other words, the inner contour and particularly its front-sided end in the axial direction, which defines the ejection opening, can be formed in such a way that the ejection axial direction, which is particularly positioned orthogonally to the face spanned by the ejection opening, runs at an angle relative to the roll axis or warped to the roll axis. The roll axis can be defined according to the middle axis of a shell-shaped receiving arrangement for encompassing the paper strip roll. According to that, the orientation of the ejection axial direction lies optionally transverse to the paper supply longitudinal extension direction, for example of the roll axis, which runs through the tube-like inner hollow space of the paper strip roll so that reaching into the ejection chute as well as, if applicable, into the paper strip roll inner hollow space or to the Leporello stack upper side face by the user is facilitated, particularly when the ejection apparatus is arranged laterally to the packaging workplace of the user. It is thinkable, to orientate the ejection axial direction in a predefined ejection angle relatively to the roll axis. For example, the ejection angle can be defined between 0° and 90° transversely to the longitudinal extension direction. The ejection angle is between 5° and 45°. Particularly, an ejection angle can be defined between 10° and 20°. For a predefined mounting of the packaging material dispenser at a packaging working space, one of the above-mentioned or a different region can be defined particularly for an ejection angle between the ejection axial direction and the longitudinal ejection direction.

For an apparatus with a chute axis running transversely to the roll axis, an undesired sliding-off of the inner windings of the paper strip roll can be realized until a smallest inner diameter, which is significantly smaller than the guaranteed inner diameter of a paper strip roll being realized on a completely rotation-symmetric chute with coaxial orientation of the chute. By that, more windings and therefore a greater paper strip supply can be provided. Optionally, the ejection axial direction cutting the ejection opening centrally can be arranged displacedly and/or angularly relatively to the chute axis. For such an embodiment, the chute axis can be arranged transverse to the longitudinal extension direction and the ejection can be arranged in the axial direction transverse to both the paper supply unit longitudinal extension direction, such as the roll axis or the upper side face, and the chute axis. Thus, the angle position for the Leporello stack and paper strip roll, respectively, chute axis and for ejection material for example being predefined regarding a packaging workspace can be configured in order to hold the paper supply unit in the receiving unit optimally against the axial fixture for allowing a good forming performance by the paper supply unit into a tube-like, spiral-shaped packaging material when drawing the paper strip for example from the inner side of the paper supply roll and/or for assuring a particularly favorable orientation of the ejection axial direction with regard to the packaging working space. For example, the ejection axial direction can run parallel relatively to the chute axis.

According to an embodiment of the apparatus for the manual or machine production of a tube-like packaging material, which his combinable with the previous, the ejection opening being completely surrounded by the walling can form a particularly annular passage face and/or star-shaped passage face, orthogonal to the ejection axial direction, which is arranged eccentrically to the roll axis. In particular, the ejection opening can be arranged eccentrically in such a way that the roll axis does not cut the passage face. For example, the passage face at the ejection opening can be formed annularly, elliptically, star-shapedly or polygonally, with nose-like extensions in the shape of the front-sided axial recesses. Such an embodiment was found to be particularly favorable for a good and easy removal of the packaging material from the paper supply unit and at the same time allows using a very narrow inner hollow space, without them sliding off the packaging material dispenser unintentionally.

According to an embodiment of the apparatus for the production of a tube-like packaging material, the guiding chute can define an essentially rectangular and/or at least section-wisely rounded chute base cross-section at its receiving-sided inlet region, for example a rear-sided sleeve section. The shape of the chute base cross-section can be configured continuously essentially along the chute axis with different widths reducing according to the chute narrowing. The chute cross-section can for example be rectangular and the inner contour of the chute section can form a pyramid- or pyramid section-shaped inner contour. Alternatively, the chute base cross-section can be cylindrical or oval and the chute inner contour can be formed cone section-shaped or cone-shaped according to the annular and/or oval chute base cross-section. It is thinkable, that a chute base cross-section has two particularly rectangularly abutting side edges that are connected by a quarter circle-shaped section at their distant ends. Alternatively, short, straight edge sections starting at the ends of both of the longish base sides are provided between two side edges of the chute base cross-sections being orthogonal to each other and a quarter circle-shaped curvature section opposing the tip. Other embodiments are thinkable.

According to a special embodiment of the apparatus for the manual production of a spiral tube-shaped packaging material, the apparatus is free of a drive, such as an electric drive, for conveying the packaging material and/or the paper strip. According to this embodiment, the apparatus is free of in particular motor-driven, such as electromotor-driven, conveying means, such as conveying drums. Furthermore, the apparatus of this embodiment is free of in particular motor-driven, such as electromotor-driven, separation means, such as a cutting apparatus, for example scissors, a guillotine or such.

According to another embodiment of the apparatus for the machine production of a packaging material, the apparatus comprises conveying means, such as conveying and/or forming drums, for conveying the packaging material and/or the paper strip as well as an in particular electrical drive for operating this conveying means. The apparatus of this embodiment can, if applicable, have an electrical driven separation means, such as a cutting device, for example scissors, a guillotine, a rotary cutter or such, for cutting-off a cushion material unit, such as a cushion, from the tube-like packaging material.

According to the invention, a system can be provided comprising an apparatus for the manual or machine production of a tube-like packaging material as described above as well as a paper supply unit to be conveyed in the receiving arrangement, a roll, defining a roll outer diameter and an axial roll length and/or a particularly essentially cuboid Leporello stack, wherein the paper supply unit can be movable by the transport means in the ejection direction from a first position, such as an engagement position displayed rearwards relatively to the guiding chute against the ejection direction, by at least the axial unit length into a second position, particularly into the ejection position positioned upstream in the ejection direction, which can be defined with an inner contour of the guiding chute for example by a touching contact at the front-sided front side of the paper supply unit.

The invention also refers to a packing station with an apparatus for the manual or machine production of a tube-like packaging material from a paper supply unit, such as a paper strip wound up to a roll, defining a roll longitudinal axis and forming an inner hollow space, or an in particular essentially cuboid Leporello stack, from which the paper strip is drawable in the ejection direction for forming a packaging material. The apparatus can be formed as described above. The packaging material production apparatus of the packing station comprises a receiving arrangement for at least partly circumferentiatingly encompassing at least one paper supply unit, particularly several paper supply units arranged sequentially behind each other in the ejection direction. Furthermore, the packing station comprises a frame, on which this apparatus is mounted. The same extends from a front-side of the frame to face the packing staff, where the packaging material is drawable, to a rear-side to be averted from the packing staff, where the receiving arrangement is allocable with at least one further paper supply unit. The frame of the packing station has opening at the front side, in particular, an opening of the guiding chute of the packaging material production apparatus, through which the packaging material is drawable. The packing station can have a refill opening at the rear side to be averted to the packaging staff, through which the packing station is occupiable with fresh paper supply units. Optionally, the packing station is equipped with an apparatus described above comprising a transport means for transporting the paper supply units loaded from the rear side via the transport means from the rear side of the frame to its front side.

According to a further development of the packing station according to the invention, the apparatus for the production of a tube-like packaging material can be arranged beneath, completely beneath a frame upper side of the frame. In particular, the apparatus can be arranged in a duct formed by the frame, which is encasing at least the receiving arrangement particularly at least halfway along its extension in the ejection direction, relatively to the longitudinal extraction direction of the paper supply unit, for example the roll longitudinal axis, entirely circumferentiatingly, in particular tunnel-like.

According to one embodiment of the packing station, which is combinable with the previous, the apparatus of the packing station, in particular the receiving arrangement and/or the longitudinal extension direction of the paper supply unit, for example the roll axis or Leporello stack bottom side, can extend essentially, in particular with a tilting of less than +/−10° or +/−5°, horizontally from the paper supply unit arrangeable and arranged, respectively, inside the receiving arrangement, which can be arranged flushingly to each other.

BRIEF DESCRIPTION OF THE DRAWINGS

Further embodiments of the invention can be gathered from the subclaims. Further properties, advantages and features of the invention become apparent by the following descriptions of preferred embodiments of the invention by the drawings attached, which show:

DETAILED DESCRIPTION

Figure 1A:
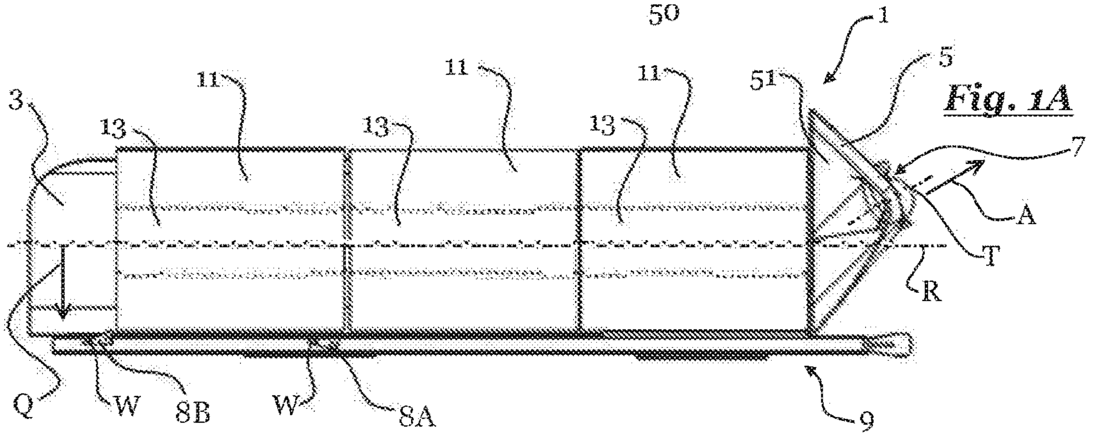
FIG. 1A shows an apparatus according to the invention for the production of a tube-like packaging material loaded with three paper strips wound up to rolls.

In the following, for the same or similar components of the different representations the same or similar reference numerals are used for easier readability and understandability.

A packaging material dispenser according to the invention and an apparatus for the manual or machine production of a tube-like packaging material, respectively, according to the invention is denoted in the following in general with the reference numeral "1". The apparatus 1 for the production of a tube-like packaging material from a paper supply unit in the shape of a paper strip wound up to a roll 11 comprises as main part a receiving arrangement 3 (and 3' or 3", respectively) for encompassing at least partly circumferentiatingly at least one roll, a guiding chute 5 with an opening 7 for ejecting the packaging material from a roll 11 arranged in an ejection position 50 as well as a movable transport means 9 for displacing at least one roll 11 in the ejection direction A. The paper strip each wound up to a roll 11 defines a roll axis R. The paper strip rolls are embodied coreless, in particular without cardboard core, and have a cylindrical inner hollow space 13, which is formed from the innermost layer of the paper strip. The innermost paper layer is drawn from the inner hollow space 13 of the rolls for producing packaging material.

A forward orientation is defined in the ejection axial direction A by the ejection direction of the packaging material, which is referred to in the following. The receiving arrangement 3 is arranged in front of the guiding chute 5 regarding the ejection axial direction A. The respective rear-sided front side 17 of the rolls 11 faces in the direction of a rear-sided refill opening side of the apparatus 1 in the embodiments shown in FIGS. 1*a* to 1*d*. The receiving arrangement 3 can be opened essentially completely circumferentiatingly at the refill rear side of the apparatus 1.

Figure 1B:
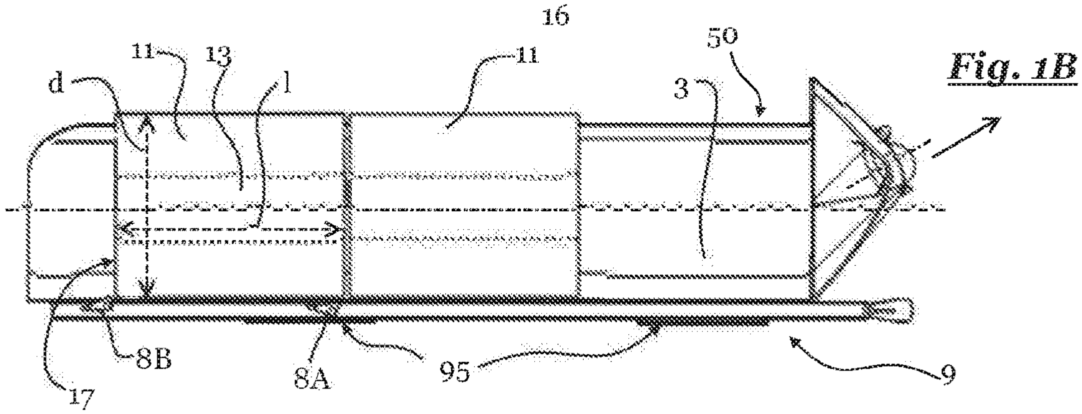
FIG. 1B shows the apparatus according to FIG. 1A, wherein the paper strip of a roll previously lying in the ejection position was completely stripped off so that the ejection position is empty.
Figure 1C:
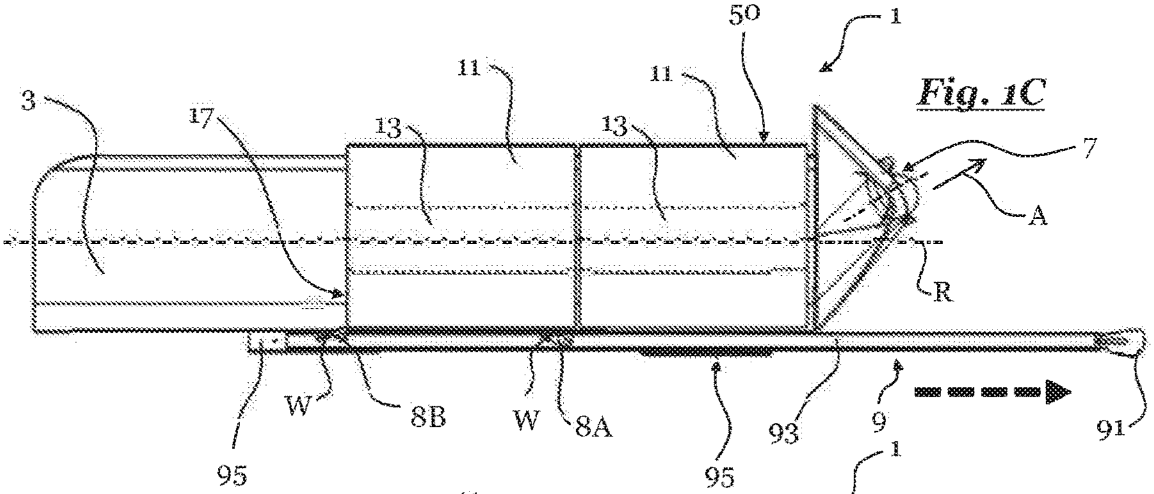
FIG. 1C shows the apparatus according to FIG. 1A, wherein, starting from the state shown in FIG. 1B, the two remaining rolls have been moved to the front with the help of the transport means so that the roll is lying in the ejection position again.

As long as the layers of the roll 4 wound up around each other are still in the static friction state, as shown schematically in FIGS. 1B and 1C, the front-sided front side 16 of the roll 11 forms a flat, slightly conical (i.e. with an opening angle of almost 180°) front face 16, which can get in touching contact at the front face with the inner contour 51 of the guiding chute 5 along its outer circumference when introducing the rolls 11 into the apparatus 1.

With the embodiments of the packaging material dispenser 1 shown in FIGS. 1A to 1D, the paper strip rolls 11 are held in a cylinder half shell-shaped receiving arrangement 3 being formed essentially form-complementarily to the outer circumference of the paper roll 11. The half shell surrounds the rolls 11 in circumference direction with an overlap of about 180°, such as between 160° and 200°. The innermost paper layer is drawn from the inner hollow space 13 for producing the packaging material along the chute-like inner contour 150 of the guiding chute 5 and is provided as spiral tube-shaped packaging material by its ejection opening 7.

The shell-shaped receiving arrangement 3 shown in FIGS. 1A to 1D, 2A and 2B can be produced in one piece from a cylinder shell-shaped, thin walling, for example of plastics, with a wall thickness of up to 5 mm or less. It is thinkable, that the receiving arrangement 3 consists of a different material, for example sheet metal. The rolls 11 and the receiving arrangement 3 are dimensioned in an attuned manner to each other that they are formed essentially form-complementary to each other, for example annularly, and/or formed coaxially and almost coaxially to each other, respectively, wherein a deviation of the coaxiality of a few centimeters, for example 0.5 cm to 3 cm, can be tolerable.

The guiding chute 5 of the embodiment shown in FIGS. 1A to 1D follows up in the axial direction A the front-sided end of the receiving arrangement 3 directly in the embodiment shown in FIGS. 1A to 1C. The inlet region of the guiding chute has a for example cylindrical base cross-section, from which a cone section-shaped guiding inner contour 51 narrows around a chute axis T in the direction of the ejection opening 7. The guiding inner contour 51 runs from the receiving unit 3 to the ejection opening 7 unobstructedly. The guiding chute 5 can be made one-pieced of one single piece, for example an ejection-molded plastic part or a part made of several plastic components. The guiding chute 5 has a walling, which can have an essentially constant wall thickness of 1 mm to 5 mm along the complete axial extension of the guiding chute.

The guiding chute 5 has at its inner side a guiding inner contour 75 narrowing from the receiving unit 3 in the direction of the ejection opening 7 chute-like. The chute-like narrowing guiding inner contour 51 defines a chute axis T. Between the chute axis T and the guiding inner contour 51, a chute opening angle is spanned. In general, a chute opening angle being variable in circumferential direction progression can be realized. It can be that the roll axis R, the chute axis T and the ejection axial direction A are aligned coaxially to each other, as for example shown in the embodiment of FIGS. 2A and 2B.

The FIGS. 1A to 1D each show the same apparatus and deviate in the number of rolls 11 present in the receiving arrangement 3 as well as in its position inside the receiving arrangement 3 and the position of the transport means 9.

In FIG. 1A, three rolls 11 lie sequentially behind each other in the receiving arrangement 3 in the axial direction A. The frontmost roll 11 in the ejection direction A has a front-sided front side 16, which is arranged directly adjacent to the guiding chute 5. When the paper strip is stripped off from the inner side 13 of the frontmost roll 11 and is ejected through the opening of the guiding chute 5, a touching contact to the front side 16 can occur. A complete or at least partly touching contact between the front-sided front side 16 and the inner side 51 of the guiding chute can be present when ejecting spiral-shaped and chute-like, respectively, packaging material through the opening 7 of the guiding chute 5 (not further depicted; it is referred to DE 20 2012 009 025 U1 for further explanations).

The frontmost roll 11 in the ejection direction A (FIGS. 1A, 1C and 1D) is located in the ejection position 50. When the frontmost roll 11 is completely unwound by drawing the paper strip from the inner hollow space 13 of the roll 11 and is thereby entirely consumed, the receiving arrangement 3 at the ejection position 5 is empty, as shown in FIG. 1B. The rolls 11 in the receiving arrangement 3 shown in FIG. 1B are not in the ejection position 15. When the ejection position 15 is not occupied with a roll 11, as shown in FIG. 1B, the user cannot readily produce further packaging material by drawing off a paper strip from a roll in the receiving arrangement 3 and drawing through the opening 7 of the guiding chute for effectuating a forming of the paper strip into a packaging material.

A roll 11 (or several rolls 11), which is carried along by the transport means 9, can be brought into the ejection position 50 by, as shown in FIG. 1C, being transported by the transport means 9 from the engagement position shown in FIG. 1B into the ejection position shown in FIG. 1C. For this purpose, the rear-sided rolls 11 (FIG. 1B) can be displaced by at least one roll length 1 to the front in the ejection direction A.

In order to achieve a movement of at least one roll 11 into a receiving arrangement 3 of an apparatus for the production of a tube-like packaging material, transport means 9 of various designs can be employed. The transport means can be realized as translation movable linear conveying means, for example as gear rack, conveying belt, conveying chain or such. In the embodiment shown in the Figures, the transport means 9 is realized by a pull rod 93 with wedge-shaped carrier 8*a*, 8*b* and an activation handle 91. Such a manually activatable transport means 9 can be for realizing a design most simple, particularly free of electronic components, particularly for realizing a purely manual arrangement for the production of a tube-like packaging material. Alternatively, a machine apparatus for the production of a tube-like packaging material, which can have particularly a machine-supported and motor-drive, respectively, forming unit, with which the motorized transport means, could be provided for example comprising an electronic activation button for activating an electronic drive motor for example for a conveying belt, a conveying chain or such, can be provided (not further depicted). For example, a pull rod or such can be provided for the activation of the apparatus from the rear side for example by reloading staff (not further depicted).

Figure 1D:
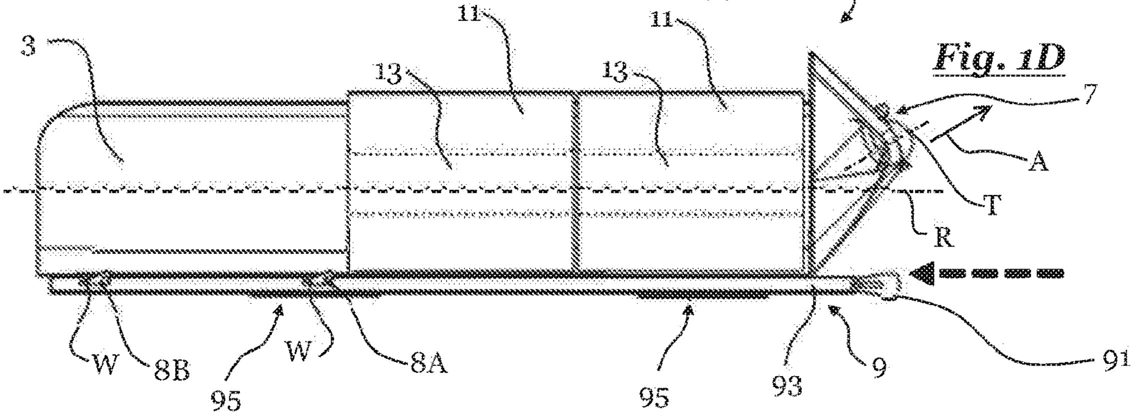
FIG. 1D shows the apparatus according to FIG. 1A, wherein the transport means is displaced from the pulled out position shown in FIG. 1C in an engagement position displaced rearwards.
Figure 2A:
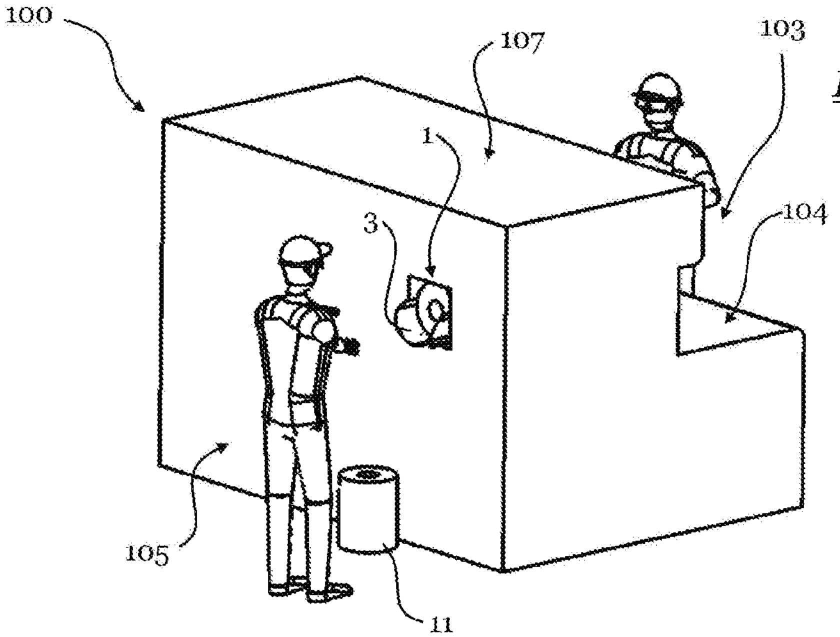
FIG. 2A shows a perspective view of a packing station according to the invention.
Figure 2B:
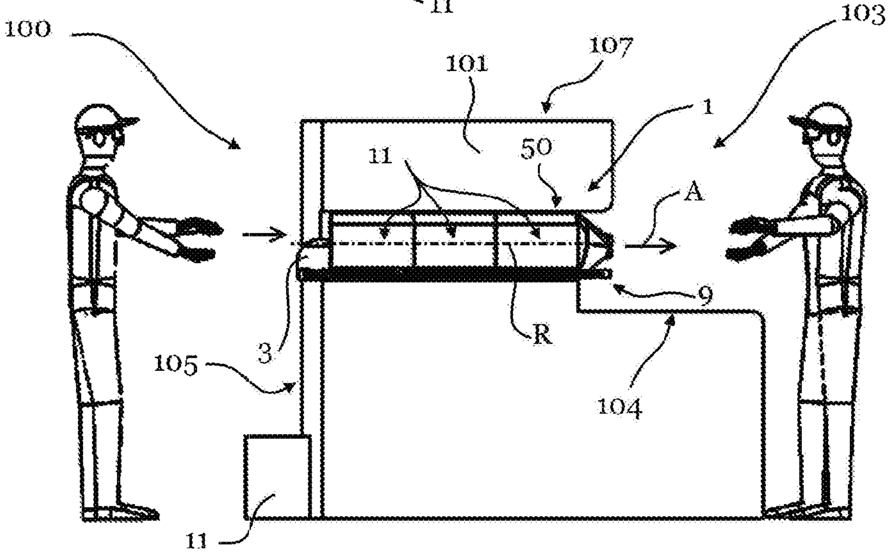
FIG. 2B shows a cut view of the packing station according to the invention according to FIG. 2A with a cutting sectional plane across an apparatus for the production of a tube-like packaging material according to the invention.

Different from the embodiment of FIGS. 2A and 2B, the ejection axial direction A according to the embodiment of FIG. 1A to 1D is eccentrically spaced relatively to the roll axis R. The chute axis T extends with an angle displacement relatively to the roll axis R.

The ejection axial direction A relative to the roll axis R according to the embodiment according to FIGS. 2A and 2B are displaced by an angle displacement. The chute axis T runs parallel to the ejection axis A and forms a chute inner contour 5 relatively to the roll axis R, essentially according to an oblique cone.

In the following, the function of the transport unit 9 is described, as shown in FIG. 1A-1D (as well as FIGS. 2A and 2B). A guiding comprising two guiding profiles 95 is arranged in the transverse direction Q vertically beneath the receiving arrangement 3 and its shell body, respectively. The pull rod 93 is slidingly supported in the guiding 95. Carriers that are realized here exemplarily as tiltable wedges 8*a*, 8*b* are stationarily supported at the pull rod 93. The transport means is, as apparent in FIG. 1B, designed in such a way that for each roll remaining in the receiving arrangement 3 after the frontmost roll is consumed an individually assigned carrier in the shape of each of a wedge 8*a* or 8*b* is provided. It is thinkable that instead, for all remaining rolls 11, a single, mutual carrier is provided that for example can be realized according to the carrier wedge 8*b*.

The transport means 9 is movable by at least one roll length 1 in the direction of the roll longitudinal axis A. It can be that at least one stopper is provided, which for example can be arranged at the guiding 95, the receiving arrangement 3 and/or the transport means, for limiting the linear movability of the transport means 9 in the direction of the roll longitudinal axis A to a predetermined maximum. A stopper or several stoppers can for example be provided for inhibiting a falling out of the transport means 9 of the guiding 95 and/or to define at least one position of the transport means, for example the engagement position and/or the ejection position.

In FIGS. 1A, 1*b* and 1*d*, the transport means 9 is located in a rear engagement position. In this engagement position, the rearmost carrier, which is realized here as tiltable wedge 8*b* arranged behind the rearmost roll 11 with respect to the ejection direction A for being brought in a touching contact with the rear-sided front side 17 of the rearmost roll 11.

In FIG. 1C, the transport means is brought into a front-sidedly displaced ejection position, for example by pulling the handle 91, for bringing the roll 11 previously displaced backwards (cf. FIG. 1*b*) into the ejection position 50 (cf. FIG. 1C). When pulling the pull rod 93 to the front, the rear-sided carrier comes into touching contact with the rear-sided roll 11 and moves the same along the roll longitudinal axis R towards the guiding chute 5. Further rolls 11 lying in front of the rear-sided roll 11 (here: a roll 11) are carried along with the movement of the rear-sided roll 11. It is thinkable that the distance between the two rolls 11 shown in FIGS. 1B and 1C is dimensioned greater than a roll length 1 (not further depicted) so that also a front-sided carrier, similar to the depicted tiltable wedge 8*a*, can be in a touching contact with the rear side of the front-sided roll 11 for directly applying a carrier force from the transport means (without force transmission by moving the roll).

In the embodiments shown in FIGS. 1A to 1D, the carriers are exemplarily realized as wedges 8*a*, 8*b*. The wedges 8*a* and 8*b*, respectively, are arrowed against the ejection direction A. The wedges 8*a*, 8*b* are tiltable by a respective tilting axis W and are supported at the transport means, here exemplarily the pull rod 93. The wedges 8*a*, 8*b* are spring pre-tensed in such a way that they can take an active transport position (as shown in FIG. 1D), in which the respective carrier is protruding into the receiving arrangement 3 for achieving a touching contact with the roll 11 for carrying the same along. A front-sided side in the ejection direction A, a wedge 8*a* and 8*b*, respectively, can be flat. The receiving arrangement 3 can have at least one axis opening for at least one carrier, for example a guiding long hole. It is thinkable that the receiving arrangement 3 has an individual axis opening for each transport means 9. The spring pre-tension of a carrier, for example of the front-sided wedge 8*a*, can be dimensioned in such a way that it is possible to shift the transport means against the ejection direction, wherein the front-sided carrier realized as wedge 8*a* does not exert a carrying effect regarding the rolls 11, but is arranged beneath the rolls 11 and slides along at the outer side of the roll 11 or rolls 11.

A rear-sided carrier, such as the wedge 8*b*, can be tiltable between an active position and a passive position for allowing that a roll 11 can be refilled in the receiving arrangement 3 from the packing station 10 without the carrier (here: wedge 8*b*) standing in the way (cf. FIG. 2*b*).

FIGS. 2A and 2B show a packing station. Similar to the packing stations known from the prior art, the packing station depicted schematically here comprises a table-like contact face 104, on which shipping containers can be placed for being filled with packaging material by staff standing at the front side 103 of the packing station 100. The contact face 104 can be supported by a frame 101.

The frame 101 supports at least one apparatus for the manual or machine production of a tube-like packaging material from a paper strip wound up to a roll 11. The apparatus, which is integrated into the frame 101 and is supported by the frame 101, can be realized as described above. The packing station 100 is designed with a receiving arrangement 3 for encompassing at least one roll 11, particularly several rolls arranged sequentially behind each other in the ejection direction A (in FIG. 2B: three rolls 11), at least partly circumferentiatingly.

At the front side 103 of the frame 101, paper for forming the packaging material can be drawn from the inner side 13 of the front-sided roll 11. At the rear side 105 of the frame 101, the receiving arrangement 3 is occupiable with at least one further roll 11 for example by a different person than the packing staff standing at the front side 103.

The apparatus of the embodiment of the packing station 100 shown in FIGS. 2A and 2B is arranged completely beneath the frame upper side 107 of the frame 101. The frame 101 forms, well recognizable in FIG. 2A, a tunnel-like duct through which the receiving arrangement 3 of the apparatus is extending. The receiving arrangement 3 and the roll axis R, respectively can extend thereby essentially horizontally through the frame 101. In particular, the tilting of the receiving unit and the roll axis, respectively, is tilted less than ±10° or less than ±5° with respect to a horizontal. A possible horizontal extension of the roll axis R allows transferring the weight of the roll 11 homogeneously and/or largely from the bottom side of the roll(s) 11 to the receiving arrangement 3, which is gentle to the material. At the same time, a horizontal arrangement of the receiving arrangement 3 and/or the roll axis R allows a relatively great control of the position and the positioning of the roll 11 in the receiving position 3, so that the roll(s) 11 cannot slip owing to gravity.

Figure 3:
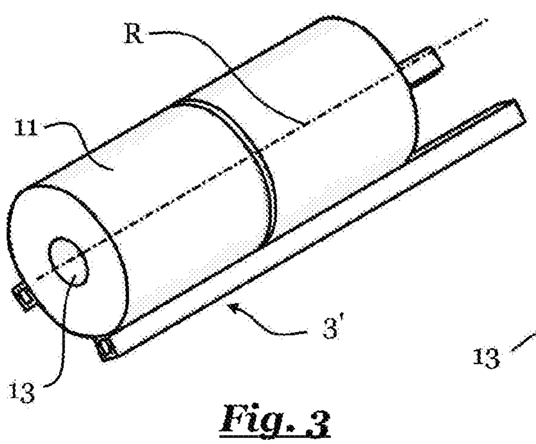
FIG. 3 shows one possible embodiment of the receiving arrangement for a packaging material production apparatus according to the invention with two struts parallel to the roll longitudinal axis.
Figure 4:
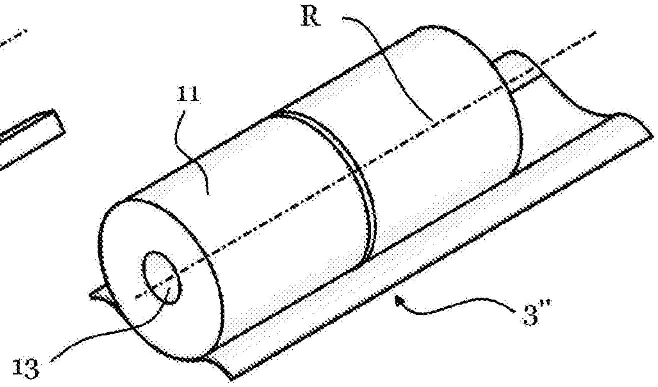
FIG. 4 shows another alternative embodiment of the receiving arrangement for a packaging material production apparatus according to the invention where paper strips wound up to rolls lie on a wave-shaped plate.

Receiving arrangements can also be formed differently from the receiving arrangement 3 with a half shell-shaped body. As an example, a receiving arrangement 3', as shown in FIG. 3, of struts and ribs, respectively, for example at least 2, at least 3, at least 4, or more struts being arranged parallel to the roll axis R on which at least one roll 11 is lying. In an alternative embodiment of the receiving arrangement 3" according to FIG. 4, the receiving arrangement 3" is formed by a wave-like bent plate 33 having a curved receiving section, which more or less matches with the curvature of the outer circumference faces of the rolls 11 and which can extend over the width of 60° to 120° along the outer side of a roll 11.

Figure 5A:
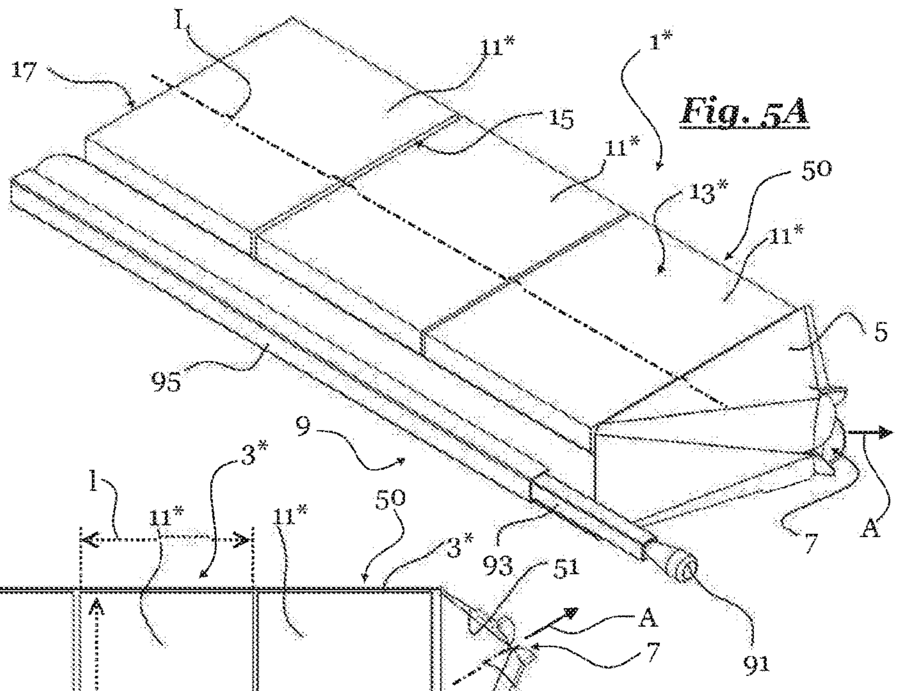
FIG. 5A shows an apparatus for the production of a tube-like packaging material according to the invention loaded with three paper strips folded to a Leporello stack.

FIG. 5A shows a perspective view of an alternative embodiment of an apparatus 1* according to the invention for the production of a tube-like packaging material from a paper strip folded or stacked from a paper supply unit in the shape of a Leporello stack 11*.

The apparatus 1* comprises, as the above-described apparatus 1 for the production of a tube-like packaging material from a paper supply unit in the shape of a paper strip wound up to a roll 11 as main component a receiving arrangement 3* (according to FIG. 7: 3, respectively) for encompassing at least one Leporello stack, a guiding chute 5 with an opening 7 for ejecting the packaging material from a stack unit 11* arranged in an ejection position 50 as well as a movable transport means 9 for displacing the at least one Leporello stack 11*** in the ejection direction A at least partially circumferentiatingly.

A Leporello stack is typically essentially cuboid with a height h, a length 1 and a width b. The upper side 13* and the corresponding typical parallel bottom side 14* of the Leporello stack 11*, respectively, each define an even surface (l*b). The Leporello stack 11* can, as shown exemplarily, be essentially cuboid, wherein the front-sided front face 15 and the rear-sided front face 17 (b*h) is orientated in the ejection axial direction A and wherein the side faces (without reference numerals; l*h) extend in the longitudinal direction L of the Leporello stack and the paper strip and essentially in the ejection direction A, respectively. The apparatus 1* according to FIGS. 5A and 5B deviates from the apparatus 1 according to FIG. 1A to 1D essentially only by the type of the received paper supply unit and the corresponding adapted shape of the receiving arrangement 3 and 3*, respectively.

Figure 5B:
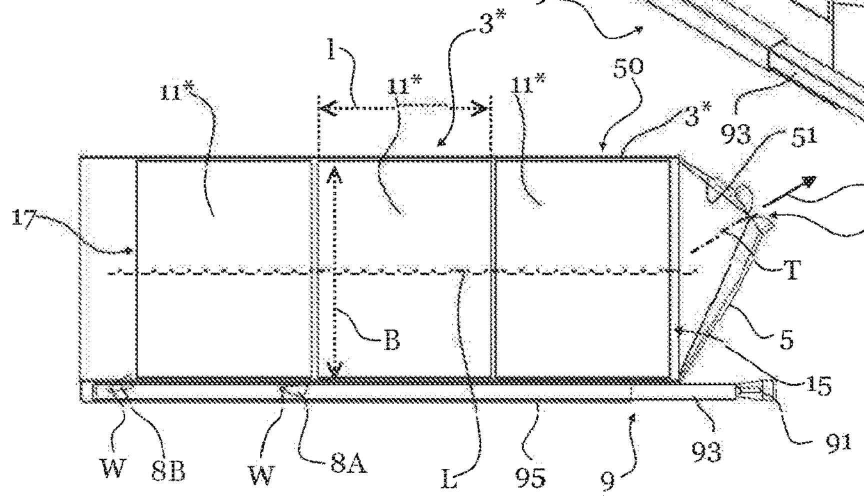
FIG. 5B shows an apparatus according to FIG. 5A in a top view.

In FIGS. 5A and 5B, the transport unit 9 is provided as pull rod 93 laterally next to the receiving arrangement 3* (stable according to FIG. 1A to 1D beneath the receiving arrangement 3). It is thinkable that the transport means 9 of the embodiment shown in FIGS. 5A and 5B are arranged beneath the receiving arrangement 3*.

Regarding the function of the apparatus 1*, it is referred to the description in FIG. 1A to 1D as well as 2A and 2B, because essentially the same actuation is realized in the apparatus 1* as in the above-described embodiment.

The packaging material is drawn off from a Leporello stack (11*)-shaped supply unit from the upper side 13* of the stack 11*. It is thinkable that the paper strip is stripped off from the front-sided front face 5 of the stack 11*, if for example the stack 11* would be orientated downwards in the vertical direction with the folding edges of the side defined by the series of layers of the Leporello stack.

Figure 6:
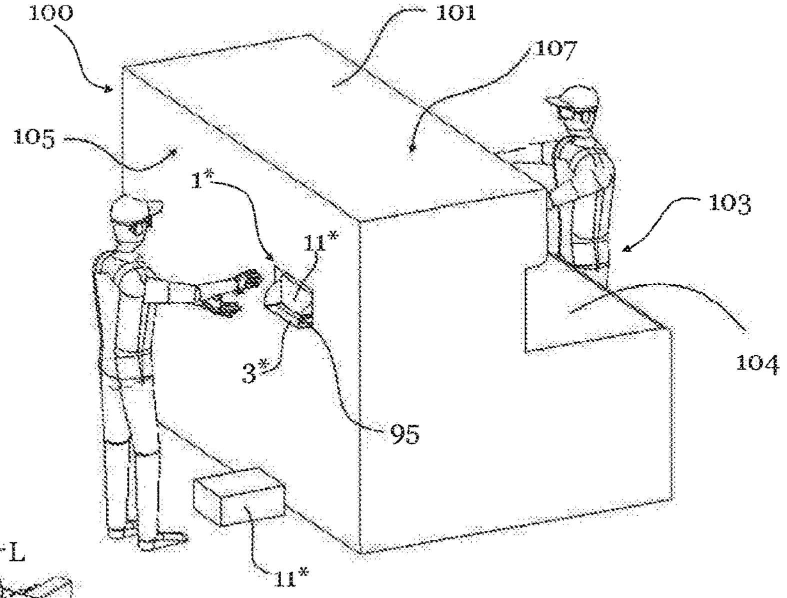
FIG. 6 shows a perspective view of a packing station according to the invention according to an alternative embodiment.

The packing station 100 shown perspectively in FIG. 6 essentially complies with the packing station 100, wherein instead of the above-described apparatus 1 for receiving roll-shaped paper supply units, an apparatus 1* for receiving Leporello stack-shaped supply units is provided.

Figure 7:
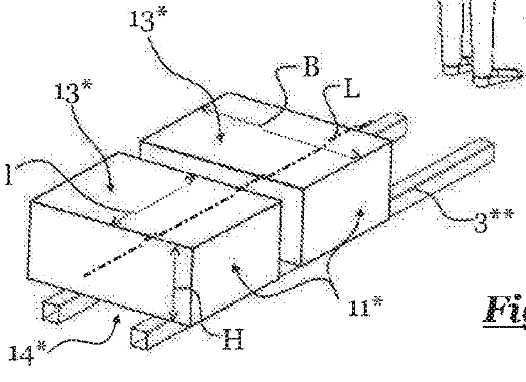
FIG. 7 shows another alternative embodiment of a receiving arrangement for a packaging material production apparatus according to the invention.

FIG. 7 essentially complies with FIG. 3, wherein the receiving arrangement 3 formed by two struts is provided for receiving the Leporello stack-shaped supply units. As shown in FIG. 7, the struts can be formed with cuboid cross-section, and form a strut upper side, which is orientated essentially flushing with the bottom side 14* of the Leporello stack 11*. It shall be clear that the struts of the receiving arrangement 3** as shown in FIG. 7 can also have a different cross-sectional shape, for example a round cross-sectional shape, or that for a Leporello stack 11* as original material also a different kind of receiving arrangement, for example the half-cylindrical receiving arrangement 3, the receiving arrangement 3* formed by two oblique struts, or even by a receiving arrangement 3** formed by a waved sheet metal, can be provided. It is also thinkable that a paper supply unit in the shape of a roll 11 can be supported in a receiving arrangement with essentially rectangular cross-section, such as the receiving arrangement 3** shown in FIGS. 5A and 5B, or be supported on the parallel, flat struts of the receiving arrangement 3** according to FIG. 7**.

The features disclosed in the preceding description, the Figures and the claims can be of importance for the realization of the invention in the different embodiments in both, singularly and also in arbitrary combination.

LIST OF REFERENCE NUMERALS

1, 1* packaging material dispenser
3, 3' or 3", 3*, 3** receiving arrangement
4 roll
5 guiding chute
7 ejection opening
8*a*, 8*b* carrier
9 transport means
10 packing station
11 roll
11* Leporello stack
13 cylindrical inner hollow space
13* upper side
14* bottom side
15 ejection position
16 front-sided front side
17 rear-sided front side
33 wave-like bent plate
50 ejection position
51 guiding inner contour
91 activation handle
93 pull rod
95 guiding profile
100 packing station
101 frame
103 front side
104 contact face
105 rear side
107 frame upper side
A ejection direction
Q transverse direction
R roll axis
T chute axis
W tilting axis
h height
b width
l length
d diameter

We claim:

1. An apparatus for the manual or machine production of a tube-like packaging material from a paper supply unit, from which a paper strip can be drawn for forming the packaging material, the apparatus comprising:
- a guiding chute with an opening configured to eject the packaging material from the paper supply unit arranged in an ejection position, the guiding chute having: an inner contour narrowing towards the opening in an ejection direction, and a receiving arrangement configured to encompass the paper supply unit at least partly circumferentially; and
- a movable transport configured to displace the paper supply unit in the ejection direction, the movable transport including at least one carrier configured to hold a radial outer circumferential face and/or an axial rear side face of at least one paper supply unit to be conveyed, wherein the at least one carrier is movable between:
  - an active position in which the at least one paper supply unit to be conveyed is movable in an ejection direction and/or the at least one carrier is engageable with at least one paper supply unit to be conveyed, the least one carrier being configured to engage and hold the paper supply unit in the receiving arrangement in the radial direction relative to a roll axis; and
  - a passive position in which the transport is movable against the ejection direction without carrying effect regarding the at least one paper supply units, and in which the least one carrier is arranged completely outside the receiving arrangement.

2. The apparatus according to claim 1, wherein the transport is movable relatively to the receiving arrangement such that the transport is movable from an engagement position displaced backwards against the ejection direction in an ejection position arranged upstream in the ejection direction.

3. The apparatus according to claim 1, wherein the transport comprises:
- a manual activation device configured to manually activate the transport, or a motorized activation device configured to activate the transport in a motorized fashion; and/or
- a translationally movable linear conveyor, the transport being located at least partly in a guide arranged adjacent to the receiving arrangement.

4. The apparatus according to claim 1, wherein the at least one carrier is biased into the active position by a spring and/or wherein the at least one carrier is formed as an arrow-shaped body or as a wedge.

5. The apparatus according to claim 4, wherein the least one carrier is tiltable between the active position and the passive position around a tilting axis being stationary relatively to the transport, wherein the least one carrier is configured to be folded in the passive position into the transport.

6. The apparatus according to claim 1, wherein the paper supply unit is a paper web wound into a roll defining the roll axis and forming an inner hollow space or a paper web folded into a Leporello stack defining an upper side.

7. The apparatus according to claim 1, wherein the receiving arrangement encompasses at least two and/or at most five paper supply units arranged sequentially behind each other in the ejection direction.

8. The apparatus according to claim 7, wherein the receiving arrangement encompasses three paper supply units arranged sequentially behind each other in the ejection direction.

9. The apparatus according to claim 1, wherein the translationally movable linear conveyor is a push and/or pull rod, a gear rack, conveyor belt, or a conveyor chain.

10. The apparatus according to claim 1, wherein:
- in the active position, the at least one carrier is configured to extend from the movable transport to engage the paper supply unit and cause the paper supply unit to move in response to movement of the moveable transport; and
- in the passive position, the at least one carrier is configured to retract back to the movable transport to disengage from the paper supply unit and allow the movable transport to move while allowing the paper supply unit to remain stationary.

11. The apparatus according to claim 10, wherein the at least one carrier extends from the transport in a first direction transverse to the ejection direction, and retracts in a second direction opposite the first direction.

12. A packaging station comprising:
- the apparatus of claim 1; and
- a frame, on which the apparatus is mounted, wherein the apparatus extends from a front side of the frame to face packaging staff, where the packaging material is drawable, to a rear side to be averted to the packing staff, where the receiving arrangement is allocable with the paper supply unit.

13. The packaging station according to claim 12, wherein the apparatus is arranged completely beneath a frame upper side of the frame and/or wherein the roll axis or the bottom side extends horizontally with a tilting of less than +/− 10° or +/− 5°, from the paper supply unit arrangable flushingly from inside the receiving arrangement.

14. A system comprising:
- a paper supply unit; and
- an apparatus configured to produce a tube-like packaging material from the paper supply unit from which a paper strip can be drawn for forming the packaging material, the apparatus comprising:
  - a guiding chute with an opening configured to eject the packaging material from the paper supply unit arranged in an ejection position, the guiding chute having: an inner contour narrowing towards the opening in an ejection direction, and a receiving arrangement configured to encompass the paper supply unit at least partly circumferentially, and
  - a movable transport configured to displace the paper supply unit in the ejection direction, the movable transport including a carrier configured to hold a radial outer circumferential face and/or an axial rear side face of the paper supply unit, wherein:
  - the paper supply unit is conveyable in the receiving arrangement, the paper supply unit defining an axial length, wherein the paper supply unit is movable in the ejection direction from a first position into a second position via the movable transport by at least the axial length, and
  - the carrier is movable between:
    - an active position in which the paper supply unit is movably in the ejection direction and/or the carrier is engageable with the paper supply unit, the carrier being configured to engage and hold the paper supply unit in the receiving arrangement in the radial direction relative to a roll axis; and a passive position in which the transport is movable against the ejection direction without carrying effect regarding the at least one paper supply units, and in which the least one carrier is arranged completely outside the receiving arrangement.

15. An apparatus for the manual or machine production of a tube-like packaging material from a paper supply unit, from which the paper strip can be drawn for forming the packaging material, the apparatus comprising:

a guide including: an opening configured to eject the packaging material from the paper supply unit arranged in an ejection position, and an arrangement configured to encompass the paper supply unit at least partly circumferentially; and a movable transport configured to displace the paper supply unit in an ejection direction, the movable transport including at least one carrier configured to hold a radial outer circumferential face and/or an axial rear side face of at least one paper supply unit to be conveyed, wherein the at least one carrier is movable between:

an active position in which the at least one paper supply unit to be conveyed is movable in the ejection direction and/or the at least one carrier is engageable with at least one paper supply unit to be conveyed, the least one carrier being configured to engage and hold the paper supply unit in the receiving arrangement in the radial direction relative to a roll axis; and a passive position in which the transport is movable against the ejection direction without carrying effect regarding the at least one paper supply units, and in which the least one carrier is arranged completely outside the receiving arrangement.

16. A packaging station comprising:

the apparatus of claim 15; and a frame, on which the apparatus is mounted, wherein the apparatus extends from a front side of the frame to face packaging staff, where the packaging material is drawable, to a rear side to be averted to the packing staff.

17. An apparatus for the manual or machine production of a tube-like packaging material from a paper supply unit, from which a paper strip can be drawn for forming the packaging material, the apparatus comprising:

a guide with an opening configured to eject the packaging material from the paper supply unit arranged in an ejection position, the guide having a receiving arrangement configured to encompass the paper supply unit at least partly circumferentially; and a movable transport configured to displace the paper supply unit in an ejection direction, the movable transport including a carrier that is configured to be selectively engageable with the paper supply unit, the carrier being movable between: (a) an engaged position in which the carrier extends from the transport and is configured to engage the paper supply unit and cause the paper supply unit to move in response to movement of the transport; and (b) a disengaged position in which the carrier retracts from the engaged position so as to disengage from the paper supply unit and allow the transport to move while allowing the paper supply unit to remain stationary.

18. The apparatus according to claim 17, wherein the guide has an inner contour that narrows towards the opening in the ejection direction.

19. The apparatus according to claim 17, wherein the guide is a guiding chute.

* * * * *